United States Patent
Sishtla et al.

(10) Patent No.: US 11,835,648 B2
(45) Date of Patent: Dec. 5, 2023

(54) MULTI-BEAM MULTI-FUNCTION AESA SYSTEM

(71) Applicant: Rockwell Collins, Inc., Cedar Rapids, IA (US)

(72) Inventors: Venkata A. Sishtla, Cedar Rapids, IA (US); James B. West, Cedar Rapids, IA (US); Jacob G. Teague, West Melbourne, FL (US); Jiwon L Moran, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 307 days.

(21) Appl. No.: 17/211,266

(22) Filed: Mar. 24, 2021

(65) Prior Publication Data

US 2022/0308164 A1   Sep. 29, 2022

(51) Int. Cl.
| | |
|---|---|
| G01S 7/41 | (2006.01) |
| G01S 7/03 | (2006.01) |
| G01S 13/42 | (2006.01) |
| G01S 13/933 | (2020.01) |
| H01Q 3/38 | (2006.01) |
| G01S 13/02 | (2006.01) |

(52) U.S. Cl.
CPC ............... *G01S 7/414* (2013.01); *G01S 7/03* (2013.01); *G01S 13/426* (2013.01); *G01S 13/933* (2020.01); *H01Q 3/385* (2013.01); *G01S 2013/0254* (2013.01)

(58) Field of Classification Search
None
See application file for complete search history.

(56) References Cited

U.S. PATENT DOCUMENTS

| | | |
|---|---|---|
| 4,246,585 A | 1/1981 | Mailloux |
| 7,423,578 B1 | 9/2008 | Tietjen |
| 7,737,879 B2 | 6/2010 | Tietjen et al. |

(Continued)

FOREIGN PATENT DOCUMENTS

| | | |
|---|---|---|
| CN | 103487798 A | 1/2014 |
| EP | 0808463 B1 | 5/2000 |

(Continued)

OTHER PUBLICATIONS

Wang Yue and Cao Lanying, "Status in U.S. AESA fighter radar and development trends," IET International Radar Conference 2013, Xi'an, 2013, pp. 1-6, doi: 10.1049/cp.2013.0229. (Year: 2013).*

(Continued)

*Primary Examiner* — Bernarr E Gregory
(74) *Attorney, Agent, or Firm* — Suiter Swantz. pc llo

(57) ABSTRACT

A system and method for a multi-beam multi-function active electronically scanned array (AESA) radar operation receives radar commands from individual aircraft systems and segments a single AESA fixed panel into a plurality of subarrays to carry out each individual function commanded by the individual aircraft system. Dependent on aircraft status and phase of flight, the subarrays are sized based on desired radar function at the specific phase of flight and specific threat associated with the phase. The system dynamically shifts the subarray size, beam characteristics, power settings, and function to enable multiple function of a cost effective single AESA panel.

13 Claims, 11 Drawing Sheets

(56) References Cited

U.S. PATENT DOCUMENTS

| | | |
|---|---|---|
| 7,786,948 B2 | 8/2010 | Webb et al. |
| 8,952,843 B1 * | 2/2015 | West ................... H01Q 21/067 |
| | | 342/156 |
| 9,041,587 B2 | 5/2015 | Longstaff |
| 9,116,244 B1 * | 8/2015 | West ....................... G01S 7/414 |
| 9,419,329 B1 | 8/2016 | West et al. |
| 9,478,858 B1 * | 10/2016 | West ....................... G01S 7/414 |
| 9,568,590 B1 | 2/2017 | Haupt et al. |
| 9,680,234 B2 | 6/2017 | Love et al. |
| 10,050,336 B2 | 8/2018 | Wang et al. |
| 11,630,203 B2 * | 4/2023 | Dubois ................. G01S 13/951 |
| | | 342/26 D |
| 2005/0046607 A1 * | 3/2005 | Volman .............. H01Q 21/0025 |
| | | 342/146 |
| 2010/0060517 A1 * | 3/2010 | Nichols .............. H01Q 21/0025 |
| | | 342/357.29 |
| 2013/0214972 A1 | 8/2013 | Woodell et al. |
| 2017/0045613 A1 | 2/2017 | Wang |
| 2017/0084183 A1 | 3/2017 | Knox |
| 2018/0259641 A1 | 9/2018 | Vacanti |
| 2019/0035291 A1 | 1/2019 | Saxena et al. |
| 2019/0113610 A1 | 4/2019 | Vacanti et al. |
| 2020/0271777 A1 | 8/2020 | Vacanti et al. |

FOREIGN PATENT DOCUMENTS

| | | |
|---|---|---|
| EP | 3470875 A1 | 4/2019 |
| GB | 2504252 B | 7/2014 |

OTHER PUBLICATIONS

C. Kopp, "Active Electronically Steered Arrays: A Maturing Technology"; posted on the Internet at ausairpower.net; copyright in the year 2014. (Year: 2014).*

David Lynch et al: "Multifunctional radar systems for fighter aircraft" In: "Radar Handbook, Third Edition", Feb. 17, 2008 (Feb. 17, 2008), McGraw-Hill, XP055598995, ISBN: 978-0-07-158942-0.

Extended Search Report in European Application No. 22163310.0 dated Aug. 8, 2022, 9 pages.

Extended Search Report in European Application No. 22163311.8 dated Aug. 11, 2022, 8 pages.

Moo Peter W et al: "Overview of Naval Multifunction RF Systems", 2018 15th European Radar Conference (EURAD), European Microwave Association,Sep. 26, 2018 (Sep. 26, 2018), pp. 178-181, XP033453383, DOI: 10.23919/EURAD.2018.8546521.

* cited by examiner

MULTI-BEAM MULTI-FUNCTION AESA SYSTEM

CROSS-REFERENCE TO RELATED APPLICATIONS

The present application is related to the following U.S. Patent Applications: U.S. patent application Ser. No. 17/023,774 entitled "Agile Antenna Taper Based on Weather Radar Feedback filed 17 Sep. 2020, now U.S. Pat. No. 11,754,706; U.S. patent application Ser. No. 17/083,075 entitled ESA Based Altimeter, filed 28 Oct. 2020, now U.S. Pat. No. 11,371,840; and U.S. patent application Ser. No. 17/085,095 entitled ESA Collision Avoidance System and Method, filed 30 Oct. 2020, now U.S. Pat. No. 11,636,772, the contents of which above-named U. S. Patent Applications are herein incorporated by reference in their entirety.

BACKGROUND

Robust Ground Clutter Suppression (GCS) may be a goal of many Airborne Weather Radar (WxR) systems. Some WxR may have a desirable simple and low-cost architecture and a Low Pulse Repetition Frequency (PRF) capability to meet user demand and user desired performance. Some airborne WxR systems may employ simple algorithmic and hardware embodiments of GCS to optimize cost goals and remain cost competitive.

A robust radar system with high probability of detection GCS with commensurate low false alarm rate (FAR) Predictive Wind Shear (PWS) detection may be desirable since the antenna beam is required to look down toward a runway of intended landing on the earth's surface during approach. Additional onboard systems including weather detection, ground mapping, etc. may also benefit from robust GCS Current radars may perform GCS differentially by comparing the radar returns of two slightly different elevation pointing angles of electromechanically scanned slotted waveguide arrays (SWGA). Similar issues may arise when detecting airborne targets such as other aircraft.

Sophisticated multi-mode military airborne radars feature multiple-Pulse Repetition Frequency (PRF) and modulated waveforms to overcome these GCS challenges. However, such radar hardware architectures are prohibitively costly for a commercial operator.

Sophisticated GCS techniques, such as Space Time Adaptive Processing (STAAP) are routinely used within the military community, but are too computationally intensive requiring sophisticated hardware that are counter SWAP-C for the commercial operator. Additional electromechanically scanned GCS system may offer a 2-beam pattern (Azimuth/Elevation) or a 4-beam pattern which require a nontrivial time interval to raster scan, or "azimuthally pause and elevation jump" to acquire the radar returns of the 2-beam position/4-beam position radar returns. Unfortunately, it takes 8-16 seconds to complete the electrometrical scans to acquire the 2-beam and 4-beam patterns required for mechanical scanning. These systems expend valuable time within the radar's pulse epoch that could be used for additional radar multi-functionality Therefore, a need remains for a system and related method which may overcome these limitations and provide a novel solution to enable a single fixed AESA to segment into a plurality of subarrays enabling continuous GCS while simultaneous performing multiple additional functions.

SUMMARY

In one aspect, embodiments of the inventive concepts disclosed herein are directed to a multi-beam multi-function radar antenna system. The system may comprise a single active electronically scanned array (AESA) mounted at a fixed boresight onboard an aircraft, the single AESA configured for a segmented aperture enabling a first aperture beam having a first aperture beam characteristic, a first azimuth, and a first elevation, the segmented aperture also enabling one or more second aperture beams having a second aperture beam characteristic, a second azimuth, and a second elevation, each of the first aperture beam and the second aperture beam or beams being independently steered, coherent, and simultaneously radiated from the single AESA.

The system may also include one or more aircraft systems onboard the aircraft configured to 1) receive a specific radar dataset from the single AESA and 2) perform a system function based on the received specific radar dataset, the specific radar dataset provided by one of the first aperture beam and the second aperture beam.

For control, the system may include a controller operatively coupled with the single AESA and the aircraft system and a tangible, non-transitory memory configured to communicate with the controller, the tangible, non-transitory memory having instructions stored therein that, in response to execution by the controller, cause the controller to carry out each function of the system.

In function, the system may receive a first radar command from a first system of the aircraft system and a second radar command from a second system of the aircraft system, the first radar command includes the first aperture beam characteristic, the first azimuth, the first elevation, the second radar command includes the second aperture beam characteristic, the second azimuth, and the second elevation.

In response to the first radar command and the second radar command, the system may segment the single AESA into at least two AESA subarrays, based on the first radar command and the second radar command, to transmit and receive the first aperture beam and the second aperture beam, the first aperture beam having the first aperture beam characteristic based on the first radar command and the second aperture beam having the second aperture beam characteristic based on the second radar command and transmit and steer the first aperture beam based on the first radar command and the second aperture beam based on the second radar command.

The system may receive a first radar return from the first aperture beam and a second radar return from the second aperture beam and digitally combine the first radar return from the first aperture beam and the second radar return from the second aperture beam via a digital signal processing to create a first specific radar dataset associated with the first system and a second specific radar dataset associated with the second system.

The system may also supply the first system with the first specific radar dataset associated with the first system and the second system with the second specific radar dataset associated with the second system and execute the system function of the first system based on the first specific radar dataset associated with the first system and the system function of the second system based on the second specific radar dataset associated with the second system.

A further embodiment of the inventive concepts disclosed herein is directed to a method for simultaneous multi-beam multi-function radar antenna operation. The method may include receiving a first radar command from a first system onboard an aircraft, the first system associated with a single active electronically scanned array (AESA) mounted at a fixed boresight onboard the aircraft, the first radar command includes a first aperture beam characteristic, a first azimuth, and a first elevation associated with a first aperture beam.

The method may also include receiving a second radar command from a second system onboard the aircraft, the second radar command associated with the single AESA and includes a second aperture beam characteristic, a second azimuth, and a second elevation associated with a second aperture beam.

The method may further include receiving an aircraft state data from an aircraft state data sensor and determining a hierarchy of radar function based on the aircraft state data. Then, in response to the first radar command and the second radar command, the method may include segmenting the single AESA into at least two subarrays based on the hierarchy of radar function, to transmit and receive the first aperture beam and the second aperture beam, the first aperture beam having the first aperture beam characteristic based on the first radar command and the second aperture beam having the second aperture beam characteristic based on the second radar command.

The method may also include transmitting and steering the first aperture beam based on the first radar command and the second aperture beam based on the second radar command and receiving a first radar return from the first aperture beam and a second radar return from the second aperture beam. The method may then include digitally combining the first radar return and the second radar return via a digital signal processing and creating a first specific radar dataset associated with the first system and a second specific radar dataset associated with the second system.

The method may further include supplying the first system with the first specific radar dataset associated with the first system and the second system with the second specific radar dataset associated with the second system and executing the system function of the first system based on the first specific radar dataset associated with the first system and the system function of the second system based on the second specific radar dataset associated with the second system.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
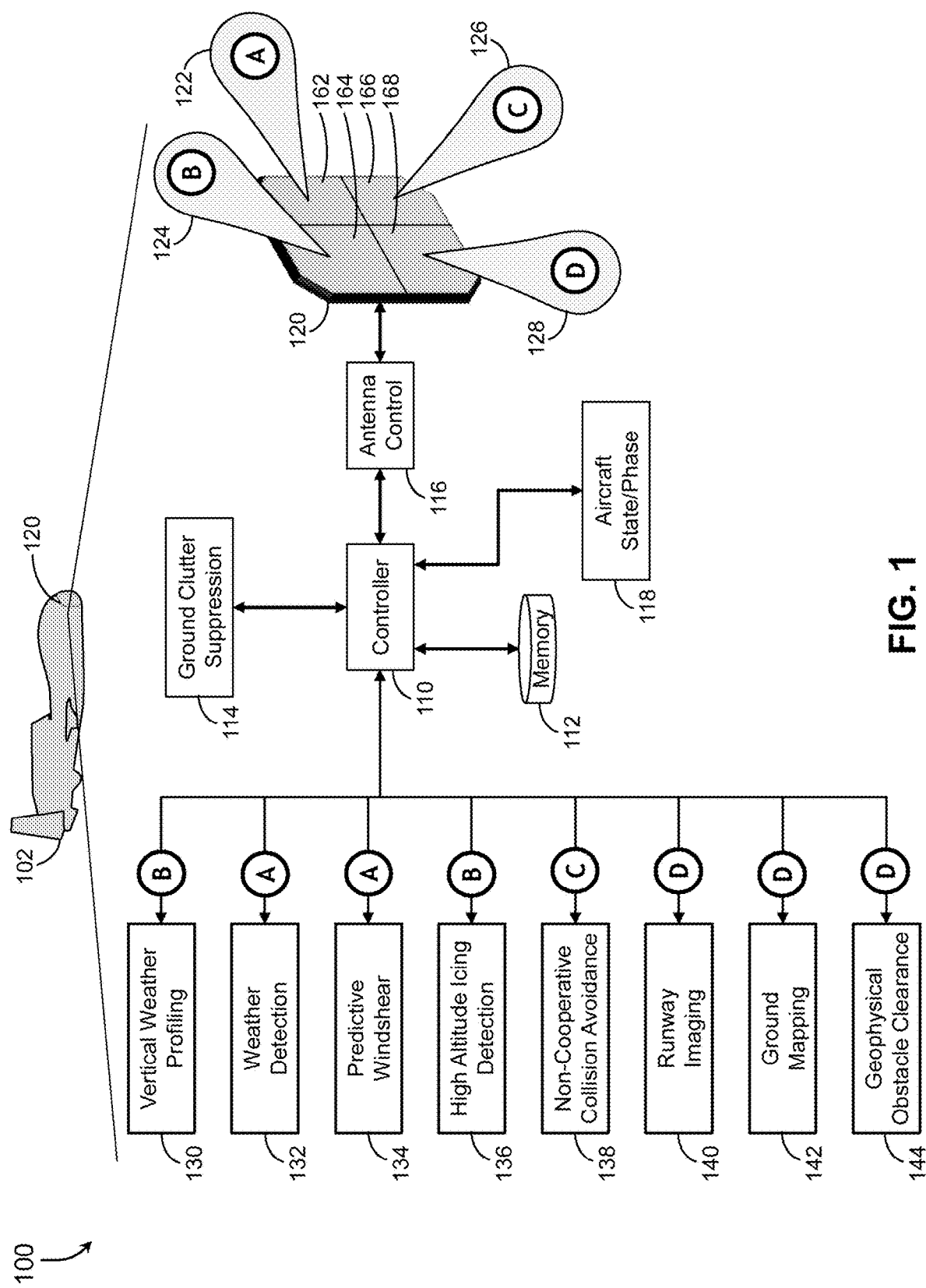
FIG. 1 is a diagram of a multi-beam multi-function radar antenna system in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

As used herein the term "approximately" in claim language as well as specification language may refer to a range of values plus or minus twenty percent (+/−20%) of the claimed value. For example, "approximately 100" may refer to, and therefore claim, the range of 80 to 120.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method for a multi-beam multi-function active electronically scanned array (AESA) radar operation. The system receives radar commands from individual aircraft systems and segments a single AESA fixed panel into a plurality of subarrays to carry out each individual function commanded by the individual aircraft system. Dependent on aircraft status and phase of flight, the subarrays are sized based on desired radar function at the specific phase of flight and specific threat associated with the phase. The system dynamically shifts the subarray size, beam characteristics, power settings, and function to enable multiple function of a cost effective single AESA panel

| REFERENCE CHART | |
|---|---|
| 100 | multi-beam multi-function radar antenna system |
| 102 | Aircraft |
| 110 | Controller |
| 112 | Memory |
| 114 | Ground Clutter Suppression (GCS) |
| 116 | Antenna Control |
| 118 | Aircraft State Data Sensor |
| 120 | Active Electronically Scanned Array (AESA) |
| 122 | Beam A |
| 124 | Beam B |
| 126 | Beam C |
| 128 | Beam D |
| 130 | Vertical Weather Profiling (VWP) |
| 132 | Weather Detection (WX) |
| 134 | Predictive Windshear (PWS) |
| 136 | High Altitude Icing Detection (HAIC) |
| 138 | Non-Cooperative Collision Avoidance (NCCA) |
| 140 | Runway Imaging (RI) |
| 142 | Ground Mapping (GM) |
| 144 | Geophysical Obstacle Clearance |
| 162 | Subarray A |
| 164 | Subarray B |
| 166 | Subarray C |
| 168 | Subarray D |
| 200 | Data Flow |
| 212 | First, n Aperture Beam Characteristics |
| 214 | First, n Radar Returns |
| 222 | n Specific Radar Dataset |
| 224 | First Specific Radar Dataset |
| 230 | First System |
| 232 | First System Data Requirement |
| 234 | First Radar Command |
| 240 | Multi-Function Display (MFD) |
| 242 | Flight Crew |
| 250 | n System |
| 252 | n System Data Requirement |
| 254 | n Radar Command |

-continued

| REFERENCE CHART | |
|---|---|
| 260 | User Interface |
| 262 | Unmanned Aircraft System (UAS) Mission Computer (MC) |
| 300 | Hardware Diagram |
| 302 | Analog Receiver 1 |
| 304 | Analog Receiver 2 |
| 306 | Analog Receiver 3 |
| 308 | Analog Receiver 4 |
| 312 | Analog to Digital Converter (ADC) 1 |
| 314 | ADC 2 |
| 316 | ADC 3 |
| 318 | ADC 4 |
| 320 | Beam Steering Computer |
| 322 | RF Exciter |
| 324 | Transmitter |
| 326 | n way delay splitter |
| 400 | Beam Characteristics Diagram |
| 404 | Azimuth |
| 406 | Elevation |
| 408 | AESA Plane |
| 410 | AESA Boresight |
| 422 | Beam A Vector |
| 424 | Beam A Azimuth |
| 426 | Beam A Elevation |
| 428 | Amplitude |
| 430 | Phase |
| 432 | Wide Azimuth Scan |
| 434 | Medium Azimuth Scan |
| 436 | Narrow Azimuth Scan |
| 442 | Wide Elevation Scan |
| 444 | Medium Elevation Scan |
| 446 | Narrow Elevation Scan |
| 500 | Approach Configuration Diagrams |
| 600 | Cruise Configuration Diagrams |
| 602 | Threat Aircraft |
| 700 | Exemplary Configurations |
| 726 | Beam E |
| 728 | Beam F |
| 800 | Method Flow |

FIG. 1

Referring to FIG. 1, a diagram of a multi-beam multi-function radar antenna system in accordance with an embodiment of the inventive concepts disclosed herein is shown. Generally, a multi-beam multi-function radar antenna system 100 may include a single active electronically scanned array (AESA) 120 mounted at a fixed boresight 410 (FIG. 4A) onboard an aircraft 102. Onboard the aircraft 102, a plurality of systems may provide an associated plurality of function to enable the aircraft 102 to perform as desired.

The plurality of systems may include at least one aircraft system onboard the aircraft configured to 1) receive a specific radar dataset from the single AESA and 2) perform a system function based on the received specific radar dataset, the specific radar dataset provided by one of the first aperture beam and the at least one second aperture beam. The plurality of systems may include a vertical weather profiling system 130, a weather detection system 132, a predictive windshear system (PWS) 134, a high-altitude icing detection system 136, a non-cooperative collision avoidance system 138, a runway imaging system 140, a ground mapping system 142, and a geophysical obstacle clearance system (GOC) 144.

Contemplated herein, additional aircraft systems may be incorporated within the scope of the inventive concepts disclosed herein and the above listing of exemplary aircraft systems may operate by way of explanation.

In one embodiment of the inventive concepts disclosed herein, the single AESA 120 may be configured for a segmented aperture enabling multiple beams radiated from multiple subarrays. In one embodiment, the multiple subarrays may radiate a first aperture beam having a first aperture beam characteristic, a first azimuth, and a first elevation. In one embodiment, the first aperture beam may be represented by beam A 122 being radiated and received by the single AESA 120.

The single AESA 120 segmented aperture may also enable a plurality of second aperture beams having a second aperture beam characteristic, a second azimuth, and a second elevation. In one embodiment, the plurality of second aperture beams may be represented by beams B 124, C 126, and D 128. In one embodiment of the inventive concepts disclosed herein, each of the first aperture beam and the plurality of second aperture beams may be independently steered, coherent, and simultaneously radiated from the individual subarrays within the single AESA 120.

In one embodiment of the inventive concepts disclosed herein, the single AESA 120 may be segmented in a symmetric quad configuration into an exemplary four subarrays including subarray A 162, subarray B 164, Subarray C 166 and subarray D 168 able to independently steer and radiate the plurality of beams 122-128.

In one embodiment of the inventive concepts disclosed herein, the multi-beam multi-function radar antenna system 100 may include a controller 110 operatively coupled with the single AESA 120 and the at least one aircraft system 130-144. In turn, the controller 110 may also be coupled with a tangible, non-transitory memory 112 configured to communicate with the controller 110, the tangible, non-transitory memory 112 may have instructions stored therein that, in response to execution by the controller 110, cause the controller 110 to carry out each function associated with the multi-beam multi-function radar antenna system 100.

Figure 3:
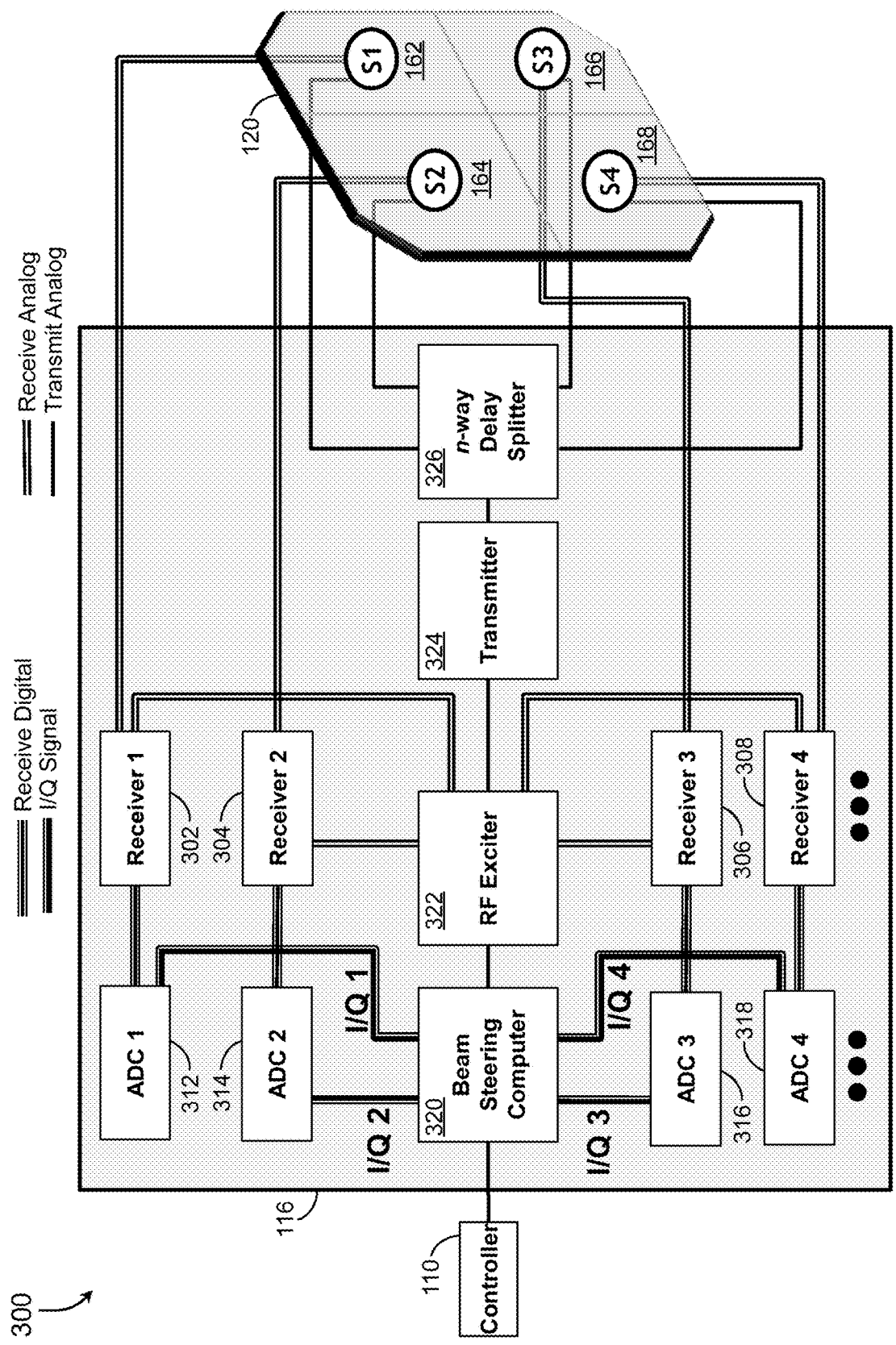
FIG. 3 is a diagram of a hardware diagram exemplary of an embodiment of the inventive concepts disclosed herein.

In one embodiment, the controller 110 may also operatively couple with and antenna control 116 configured for controlling each function of the AESA 120 with more detail in FIG. 3. An aircraft state sensor 118 may function to supply the controller with a state data and phase of flight associated with the aircraft 102. In one embodiment, the state data may represent an altitude, an airspeed, a climb configuration, a descent configuration, a cruise configuration, an approach configuration, a landing configuration, and a taxi configuration.

In one embodiment, the controller 110 may further couple with a ground clutter suppression (GCS) function 114 configured for continuously suppressing ground clutter as required by each individual aircraft system 130-144. In one embodiment, the GCS function 114 may be a function within the controller 110. However, as GCS may be a continuous function relevant to each aircraft system 130-144, it may be represented here as a separate and continuous function.

FIG. 2

Figure 2:
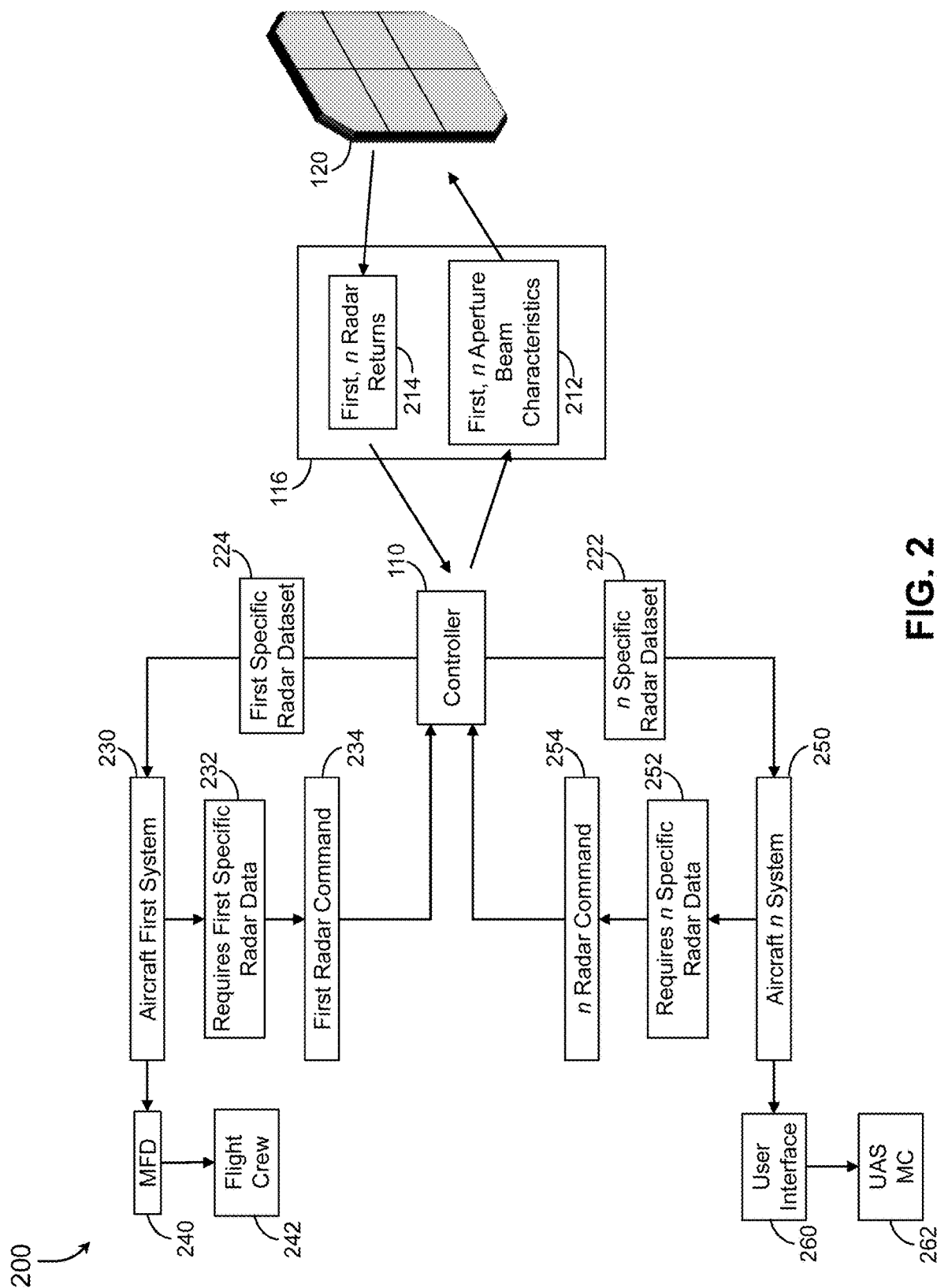
FIG. 2 is a diagram of an exemplary data flow in accordance with an embodiment of the inventive concepts disclosed herein.

Referring now to FIG. 2, a diagram of an exemplary data flow in accordance with an embodiment of the inventive concepts disclosed herein is shown. The multi-beam multi-function radar antenna system 100, through the controller 110, may function to receive a first radar command 234 from a first system 230 of the aircraft systems and a n radar command 254 from at least one n system 250 of the aircraft systems. In one embodiment, the first radar command 234 may include the first aperture beam characteristics as well as first specific data requirements 232 of the first system 230.

Further included in the first radar command 234 may be the first azimuth and the first elevation associated with the first beam 122.

In one embodiment, the controller 110 may also receive the second or n radar command 254 including a required specific radar data 252 for operation. The n radar command 254 may similarly include the second aperture beam characteristic, the second azimuth, and the second elevation.

In response to the first radar command 234 and the n radar command 254, the controller 110 may segment the single AESA 120 into at least two AESA subarrays 162-168, based on the first radar command 234 and the n radar command 254. In Transmit, the controller may command each of the first, n beam characteristics 212 to transmit the specific beams commanded by the specific aircraft system. Each individual subarray 162-168 may transmit and receive the first aperture beam 122 and the n aperture beam 124-128, the first aperture beam 122 having the first aperture beam characteristic based on the first radar command 234 and the n aperture beam 124-128 having the second aperture beam characteristic based on the n radar command 254.

Each individual subarray 162-168 may transmit and steer, using analog beamforming architecture, the first aperture beam based on the first radar command 234 and the n aperture beam based on the n radar command 254. Here, each individual subarray may transmit an individual beam where the received signals may be digitally combined for analysis and additional signal processing.

The single AESA 120 may receive a first radar return from the first aperture beam and an n radar return from the at n aperture beam 214 and digitally combine the first radar return from the first aperture beam and the n radar return from the n aperture beam via a digital signal processing to create a first specific radar dataset 224 associated with the first system 230 and a n specific radar dataset 222 associated with the n system 250.

In one embodiment, the controller 110 may supply the first system 230 with the first specific radar dataset 224 associated with the first system 230 and the n system 250 with the n specific radar dataset 222 associated with the n system. Once supplied, the controller may execute the system function of the first system 230 based on the first specific radar dataset 224 associated with the first system and the system function of the n system 250 based on the second specific radar dataset 222 associated with the n system.

In one embodiment, the first system 230 may couple with a multi-function display (MFD) 240 enabling a flight crew 242 to visualize a result of the first system 230 and make decisions based on the displayed information. Conversely, should the n system 250 be sited on an unmanned aircraft system (UAS), the controller 110 may command the aircraft n system 250 supply a user interface 260 able to configure the n specific radar dataset 222 for consumption and use by a UAS mission computer (MC) 262.

FIG. 3

Referring now to FIG. 3, a diagram of a hardware diagram exemplary of an embodiment of the inventive concepts disclosed herein is shown. The Hardware Diagram 300 may include, on a transmit flow, a Beam Steering Computer 320, a radio frequency (RF) Exciter 322, a Transmitter 324, and an n way delay splitter 326 prior to reaching the single AESA 120.

In receive, the antenna control 116 may include Analog Receiver 1 302, Analog Receiver 2 304, Analog Receiver 3

306, and Analog Receiver 4 308 feeding Analog to Digital Converter (ADC) 1 312, ADC 2 314, ADC 3 316 and ADC 4 318. ADCs may function to receive the analog signals and digitize to each of the in-phase and quadrature signals I/Q 1 through 4 prior to sending the signals to the controller 110.

In one embodiment, the multi-beam multi-function radar antenna system 100 may enable subarray level receive digital beam forming (DBF) with a multi-subarray configuration where each DBF radiating "element" is a directive 2D scanned analog AESA (e.g., within a subarray) and each subarray may have independent pattern synthesis and beam pointing.

FIG. 4

Figure 4A:
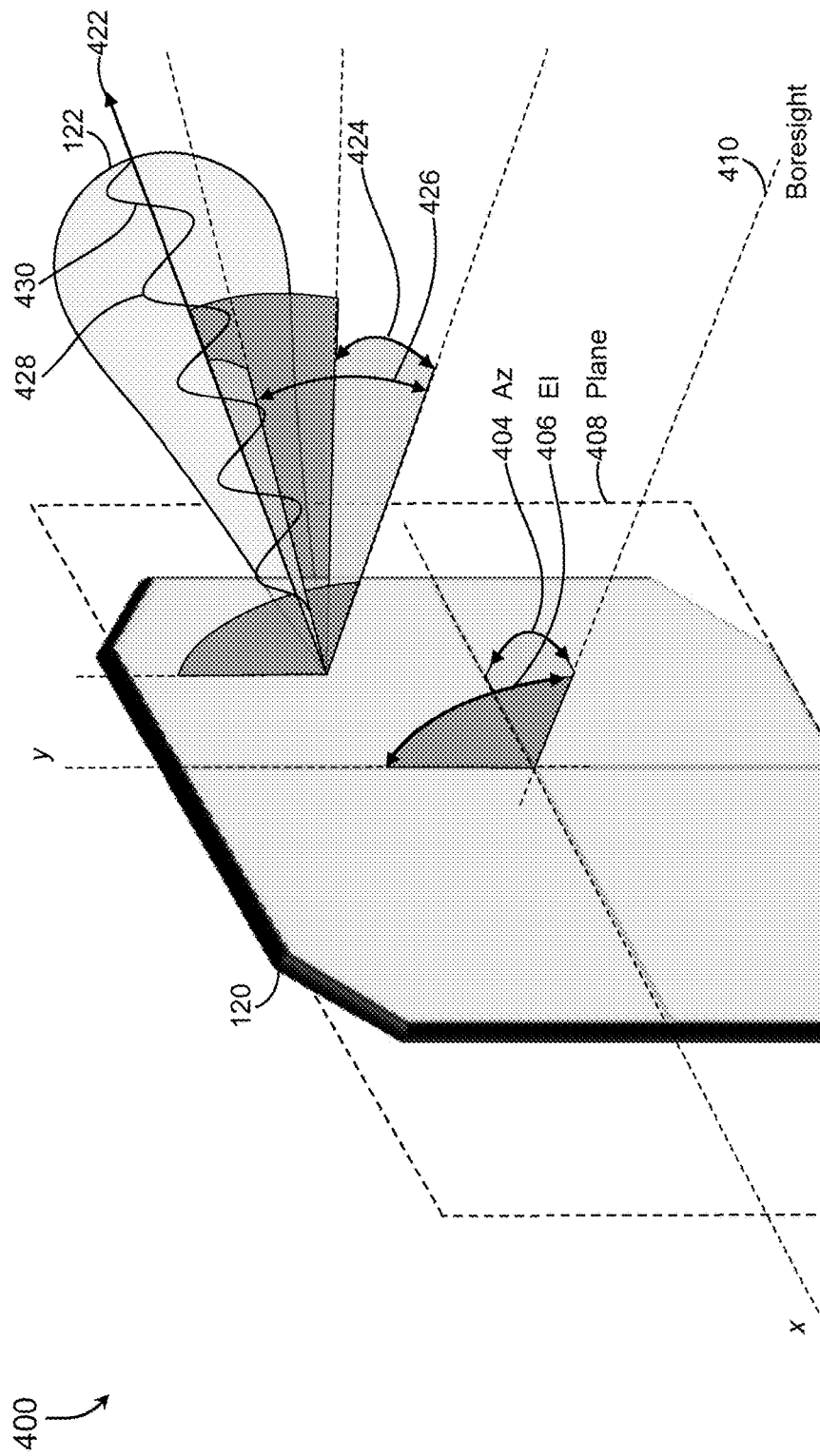
FIGS. 4A-4C are diagrams of beam characteristics exemplary of one embodiment of the inventive concepts disclosed herein.
Figure 4C:
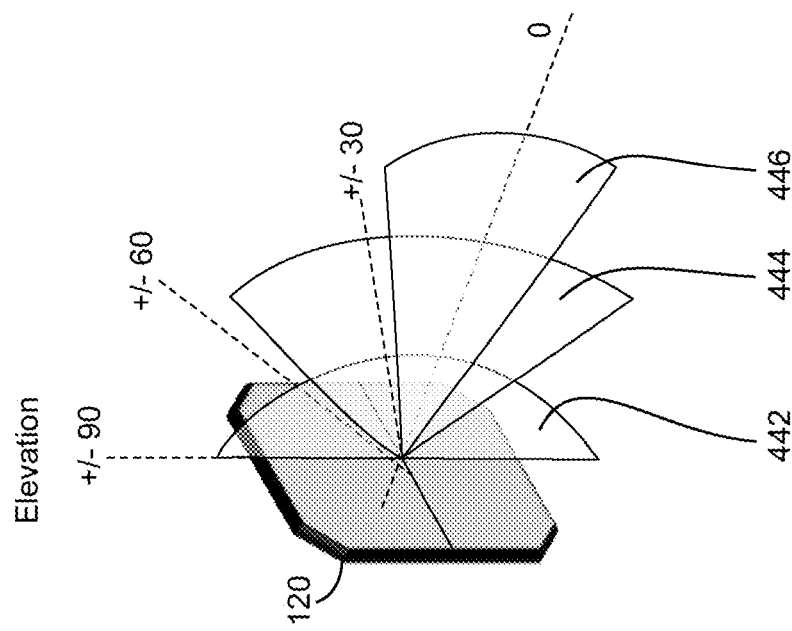
Figure 4B:
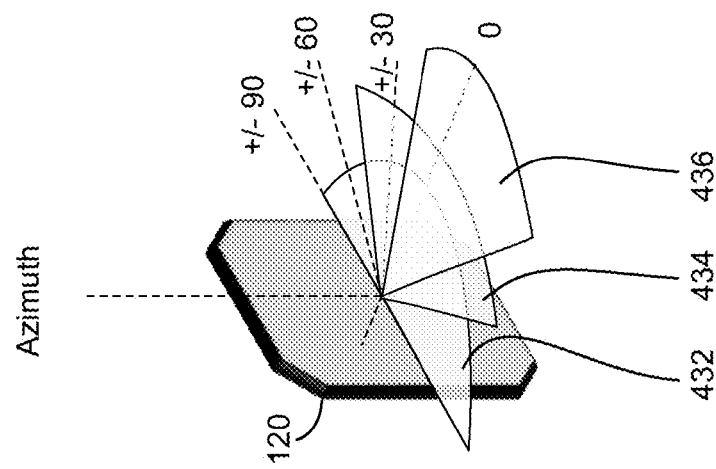

Referring now to FIGS. 4A-4C, diagrams of beam characteristics exemplary of one embodiment of the inventive concepts disclosed herein are shown. In one embodiment, the beam characteristics diagram 400 may indicate exemplary beam characteristics each of the plurality of aperture beams 122-128 may possess.

In one embodiment, each aircraft system 130-144 may command a radar command 234 including an aperture beam power (gain), an AESA segment size (symmetric and asymmetric), a beamwidth (narrow, wide, medium), an azimuth scan (narrow, wide, medium), an elevation scan (narrow, wide, medium), and a nominal side lobe level relative to the peak of the main beam (high/low).

In one embodiment, the aperture beam power may be commanded by the radar command to one of a high power of approximately 155-205 dBm, a medium power of approximately 103-154 dBm, and a low power of approximately 51-102 dBm. In this manner, the radar command may not only command a specific approximate power, but also an AESA segment size. For example, one X Band radiated power may include a 51-205 W peak, as the radar is pulled with a (1-25% duty cycle).

In one embodiment of the inventive concepts disclosed herein, the AESA subarray segment size may determine power available to the associated beam and thus target acquisition available to the associated aircraft system. A large aperture size may approximate 0.50 (half) to 1.00 (all) of the total AESA panel 120. A large subarray size may be limited to specific circumstances where the aircraft state may be in a position for an immediate action response such as in a windshear event or other scenario where most or all of the radar resources should be devoted to the specific (e.g. PWS) system.

Similarly, a medium subarray size may approximate 0.25 (one quarter) to 0.5 (half) of the entirety of the AESA 120. A small subarray size may approximate sizes less than 0.25 enabling a plurality of systems to access the limited amount of function within the AESA 120.

In one embodiment, the multi-beam multi-function radar antenna system 100 may enable a full or segmented aperture, single beam sum and difference patterns where each subarray may employ a directive 2D scanned analog AESA. The controller 110 may enable pattern synthesis by element-level amplitude and phase adjustment superimposed on the 2D bean steering command. The architecture may enable multiple full aperture receive beams with variable azimuth, variable elevation, and beam summing steered in the same direction.

In one embodiment, the controller 110 may synthesize the specific radar dataset from individual subarrays to perform a specific system function. The controller 110 may command one or more of the subarrays via the second radar command to control each of an amplitude 428 control and a phase 430 control to enable a radiation pattern synthesis between the two subarrays. This function may enable controller execution of the system function of the second system based on the radiation pattern synthesis In one embodiment, the beamwidth of each aperture beam may be inversely proportional to the aperture beam effective isotropic radiate power (EIRP). For example, a high-power aperture beam may possess a narrow beamwidth while a low power aperture beam may possess a wide beamwidth. EIRP may be a product of power amplifier power and passive aperture gain. The passive aperture gain may be varied in the EIRP as the controller 110 changes the Beamwidth. This assumes that all the of the elements are transmitting a constant RF power. It may also be possible to modulate EIRP by turning the transmit power amplimer circuits associated with each radiating element on and off. Additionally, the controller 110 may adjust the individual power on each transmit RF signal chain feeding the radiating elements.

In one embodiment, the single fixed AESA 120 may maintain an AESA plane 408 defined by a vertical axis y and horizontal axis x. Relative to the AESA plane 408, an azimuth 404, an elevation 406 may describe vectors relative to an AESA boresight 410 normal to an AESA plane 408.

Each individual aperture beam may inherently possess a beam A vector 422 as directed by the radar command 234. An exemplary beam A 122 may be defined by the power which may be relative to the AESA segment size. For example, a great AESA segment size may equate to a great available power available to the beam A 122. The beam A 122 may also be defined by the beamwidth which may also be dependent on power. For example, a greater power may offer a narrower beamwidth and thus greater range available to identify a specific target while a lesser power (with corresponding smaller aperture segment size) may offer a wider beamwidth and reduced range of target acquisition. In this example, the beam A 122 may possess the beam A vector 422 including a beam A azimuth 424 and a beam A elevation 426 relative to the AESA boresight 410.

FIG. 4B may indicate exemplary azimuth scan volumes of each individual aperture beam 122-128 while FIG. 4C may indicate exemplary elevation scan volumes. A wide azimuth scan 432 may sweep the aperture beam approximately +/−80 degrees form the boresight 410, a medium azimuth scan 434 may sweep the aperture beam approximately +/−60 degrees from the boresight 410, while a narrow azimuth scan 436 may limit the aperture beam to sweep approximately +/−30 from the boresight 410.

Similarly in elevation, FIG. 4C each individual aperture beam 122-128 may indicate a wide elevation scan 442 may sweep the aperture beam approximately +/−80 degrees form the boresight 410, a medium elevation scan 444 may sweep the aperture beam approximately +/−60 degrees from the boresight 410, while a narrow elevation scan 446 may limit the aperture beam to sweep approximately +/−30 from the boresight 410.

In one embodiment of the inventive concepts disclosed herein, the side lobe peak level and the overall noise floor may indicate how much side lobe-induced spurious signals that can cause interference the aircraft system is willing to tolerate and remain functional offering valid data. In one embodiment, a low side lobe levels may indicate the aircraft system may be susceptible to side lobe interference. For example, a ground mapping system operating below 10,000 ft MSL may be susceptible to a side lobe interference given a low power output and proximity to the ground. Conversely, a high side lobe level may indicate a lower susceptibility to side lobe interference. For example, a high-altitude icing detection system may be less likely to be affected by side lobe interference given the high altitude and likely smaller elevation scan volume.

In one embodiment of the inventive concepts disclosed herein, the controller 110 may command a specific subarray configuration based on the received radar commands. In one embodiment, the weather detection system 132 radar command may include a high power, a large AESA segment size, a narrow beamwidth, and a high side lobe level. In another embodiment, the vertical weather profiling system 130 may command a medium power, a medium AESA segment size, a narrow beamwidth, a large elevation scan, and a high side lobe level.

In one embodiment, the predictive windshear system 134 may command a high power, a large AESA segment size, a narrow beamwidth, a medium azimuth scan, a medium elevation scan, and a low side lobe level while the high altitude icing detection system 136 may command a high power, a medium AESA segment size, a narrow beamwidth, and a high side lobe level.

In another embodiment, the noncooperative collision avoidance system 138 may command a low power, a small AESA segment size, a wide beamwidth, a wide azimuth scan, a wide elevation scan, and a low side lobe level to detect a second aircraft and the ground mapping system 142 and wherein the second radar command further comprises a low power, a small AESA segment size, a narrow beamwidth, and a low side lobe levels.

In one embodiment, the runway imaging system 140, the ground mapping system 142, and the geophysical obstacle clearance system 144 may command a low power, a small AESA segment size, a wide beamwidth, and a low side lobe level.

FIG. 5

Figure 5A:
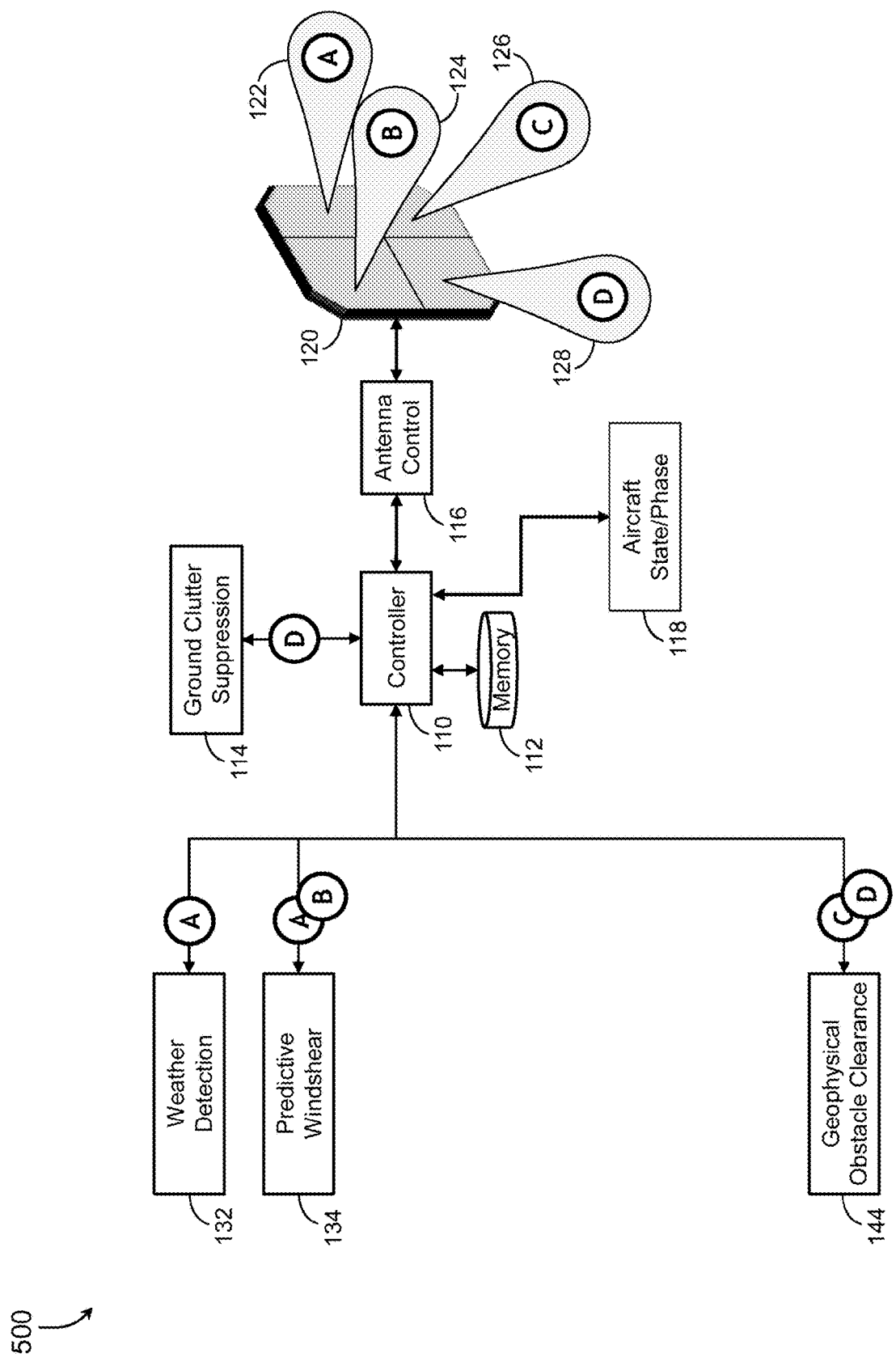
FIGS. 5A and 5B are diagrams of an exemplary approach aircraft state configuration and scenario in accordance with one embodiment of the inventive concepts disclosed herein.
Figure 5B:
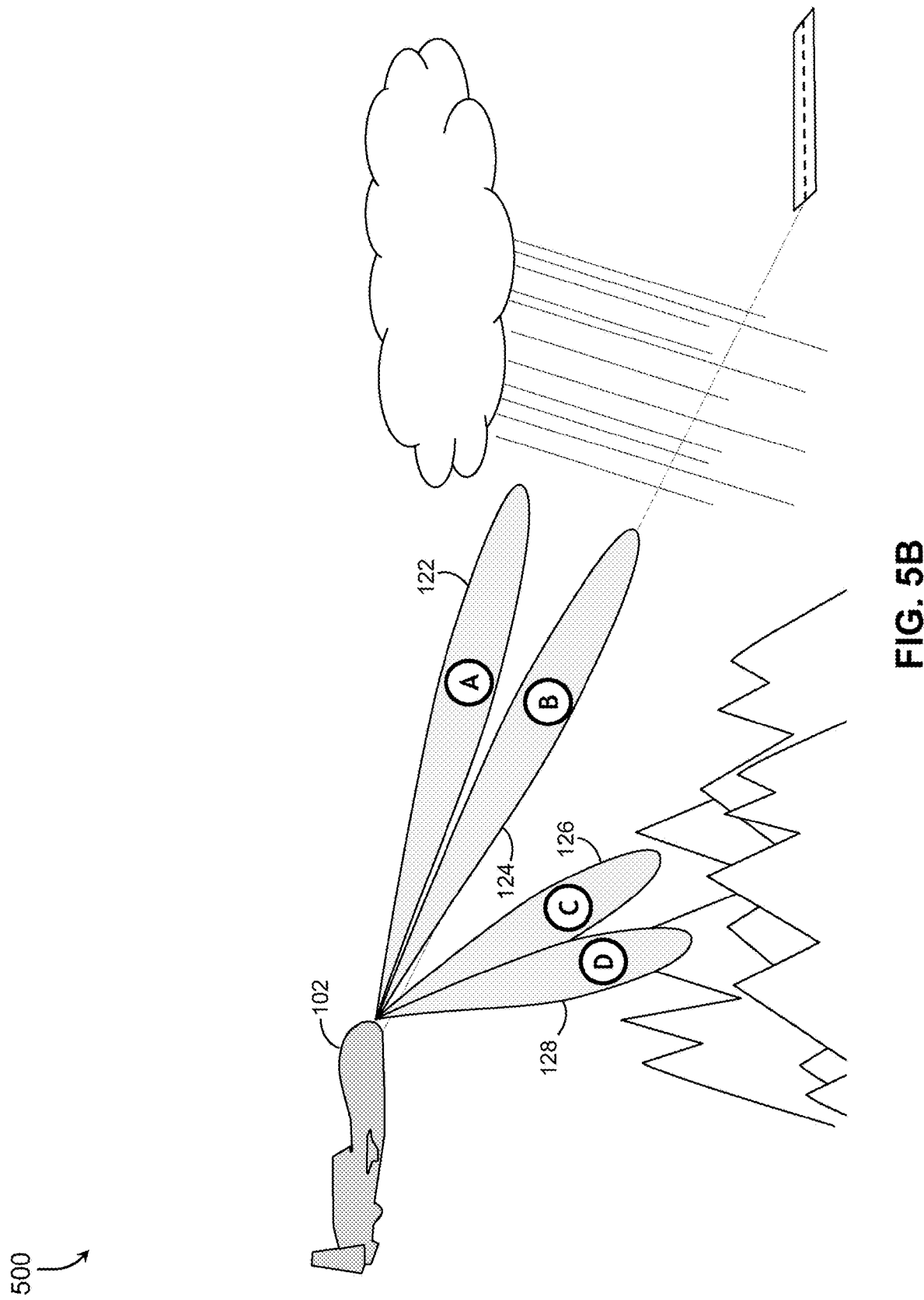

Referring now to FIGS. 5A and 5B, diagrams of an exemplary approach aircraft state configuration and scenario 500 in accordance with one embodiment of the inventive concepts disclosed herein are shown. One exemplary approach configuration may include a scenario with the aircraft state being on an approach to intended landing where the weather detection system 132, the PWS 134, and the GOC system 144 are operational and sharing the single AESA 120.

At low altitude on approach, GCS 114 may be one high priority for use of one of the aperture beams. Here, aperture beam D 128 may function to supply information to the controller 110 for GCS a portion of the time while also supplying information to the GOC system 144 during the remaining time. As obstacle clearance may be a lower elevation scan than each of the weather and PWS, the controller 110 has commanded the single AESA 120 to a quad configuration enabling aperture beams C 126 and D 128 available to the GOC system 144. The controller 110 has commanded the aperture beam A 122 available to the weather detection system 132 while each of the aperture beams A 122 and B 124 are available to the PWS 134. Also in this example, aperture beam A 122 may be allotted to the weather detection system 132 and the PWS 134 on a time sharing basis where a first time slot and beam characteristic is made available to the weather detection system 132 while a second time slot and second bean characteristic are available to the PWS 134.

In one embodiment of the inventive concepts disclosed herein, the multi-beam multi-function radar antenna system 100 may include an aircraft state sensor configured to provide an aircraft state data and phase of flight to the controller 110. Here, the controller 110 may receive the aircraft state data and phase of flight and determine a radar function hierarchy based on the received aircraft state data and phase of flight. For example, the aircraft state data may indicate the aircraft is at 2000 ft AGL on an approach in an approach configuration. One exemplary radar function hierarchy may have PWS 134 near the top since windshear may be one of the highest threats to a safe landing.

FIG. 5B may indicate the approach scenario with aperture beams A 122 and B 124 imaging the weather while aperture beams C 126 and D 128 are imaging the terrain. Of note, each individual aperture beam 122-128 is operating in compliance with the aircraft system radar command 234 254 with respect to power, subarray segment size, etc.

FIG. 6

Figure 6A:
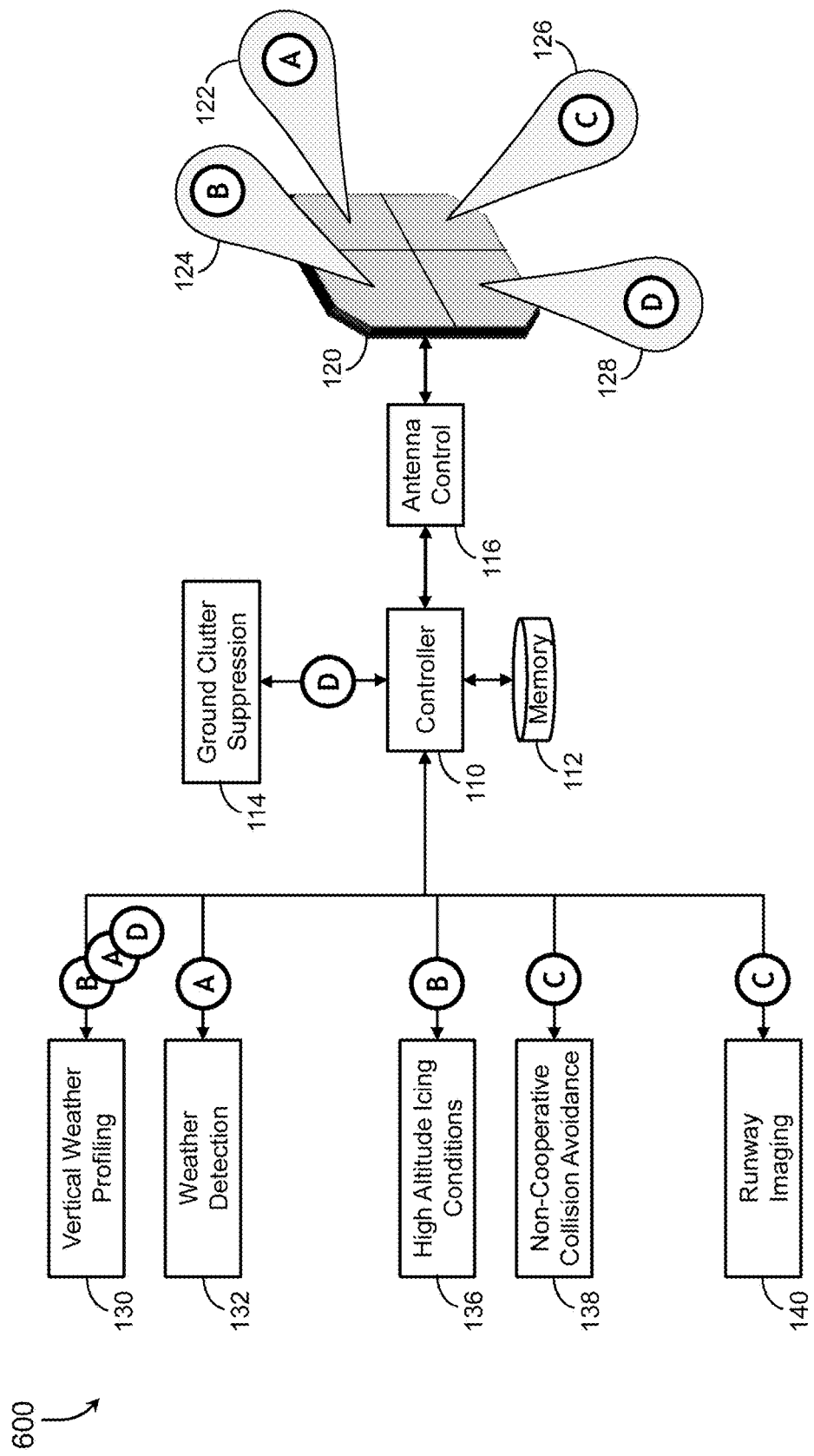
FIGS. 6A and 6B are diagrams of an exemplary cruise aircraft state configuration and scenario in accordance with one embodiment of the inventive concepts disclosed herein.
Figure 6B:
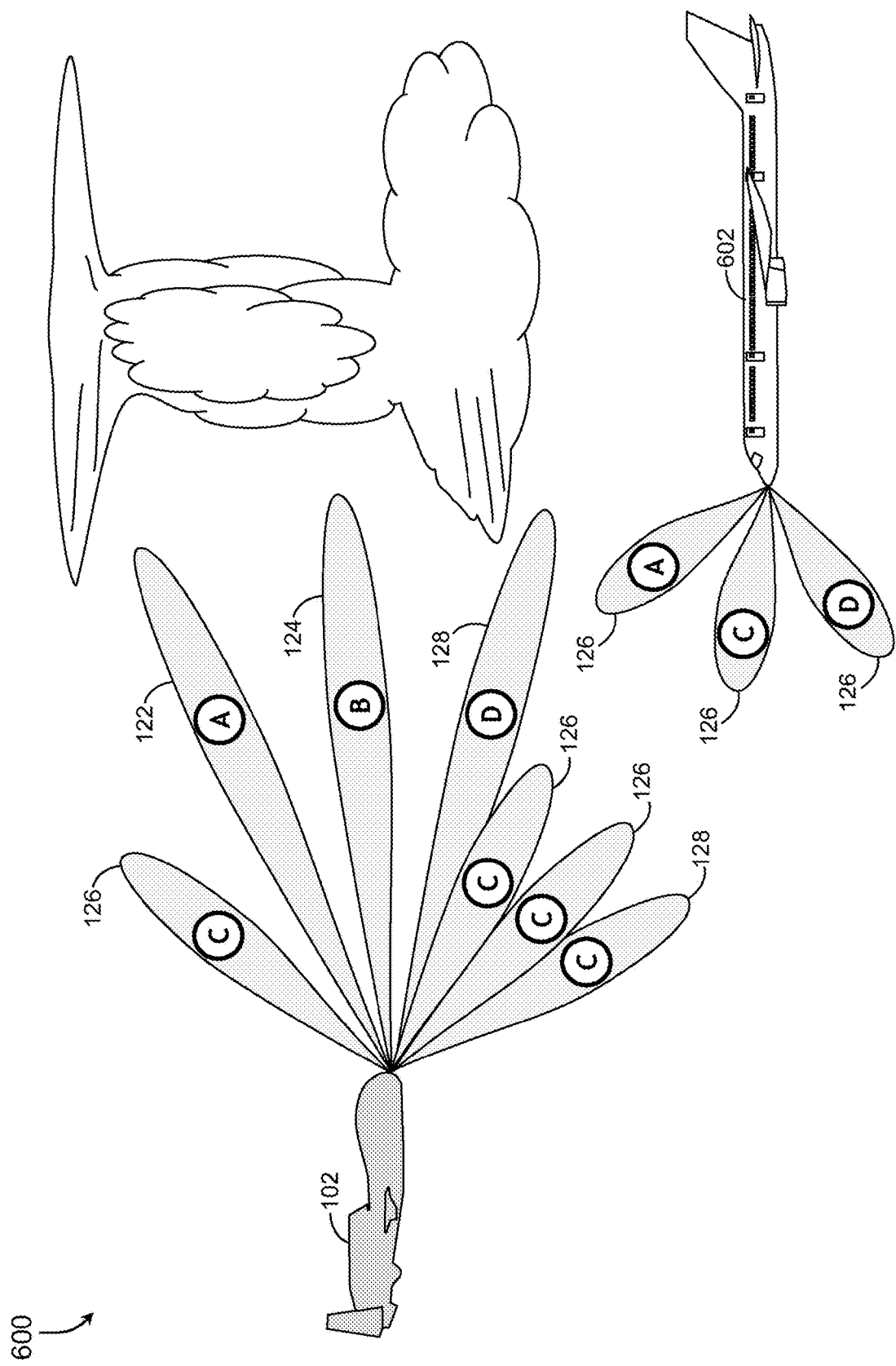

Referring now to FIGS. 6A and 6B, diagrams of an exemplary cruise aircraft state configuration and scenario 600 in accordance with one embodiment of the inventive concepts disclosed herein are shown. In this cruise high altitude example, five aircraft systems are sharing the limited space and time available on the single AESA 120. Here, the vertical weather profiling system 130, the weather detection 132, the HAIC system 136, the NCCA system 138 and the runway imaging system 140 are either space sharing or time sharing the single AESA 120.

In one embodiment, the multi-beam multi-function radar antenna system 100 may enable simultaneous multiple beams for successful GCS 114 as one beam may be configured for the target detection (e.g. rain) and the second beam may be configured to characterize ground clutter. The controller 110 may co-process the separate beams to extract the rain signal out of the ground clutter.

In another embodiment, the multi-beam multi-function radar antenna system 100 may enable multiple time coincident beam radar return acquisitions to enable coherency in the return signal to minimize a need for non-coherent return processing. Thus, the controller 110 may eliminate a requirement for a temporal filter to retain coherency.

In one embodiment, the controller 110 may command a time-based switching of a function of a subarray between compliance with the first radar command and compliance with the second radar command. In this example, VWP 130 and WX 132 are time sharing aperture beam A 122, VWP 130, HAIC 136, and NCCA 138 are time sharing aperture beam B 124, NCCA 138 and RY 140 are time sharing aperture beam C 126, and VWP 130 is time sharing aperture beam D 128 with GCS 114. Here, Multiple beams at differing elevations may enable differential dBz measurements for hail detection and icing detection.

In one embodiment, the controller 110 may command a dynamic Inter subarray reconfiguration combining two or more subarrays and tailoring the excitation of the combined subarray. For example, one inter subarray reconfiguration may include the controller 110 changing one subarray from GM 142 to WX 132 or alternating the function of of a subarray from one function to another at alternating times.

In one embodiment, the multi-beam multi-function radar antenna system 100 may enable multiple beams of differing pattern characteristic to offer simultaneous radar mode operation. For example, a cosecant squared antenna beam useful for ground mapping may be radiated simultaneous with non-cooperative collision avoidance beam.

FIG. 6B may indicate aperture beam availability as well as differences in EIRP output of each aperture beam. As aperture beams A B and D may be used by the VWP 130, output power of each of those may be increased for increased range to scan the vertical entirety of the weather system forward of the aircraft 102. As less power may be required of the NCCA 138, aperture beam C 126 may maintain less power output (as well as less segment size within the single AESA 120) for imaging a threat aircraft 602 and accurate operation.

FIG. 7

Figure 7C:
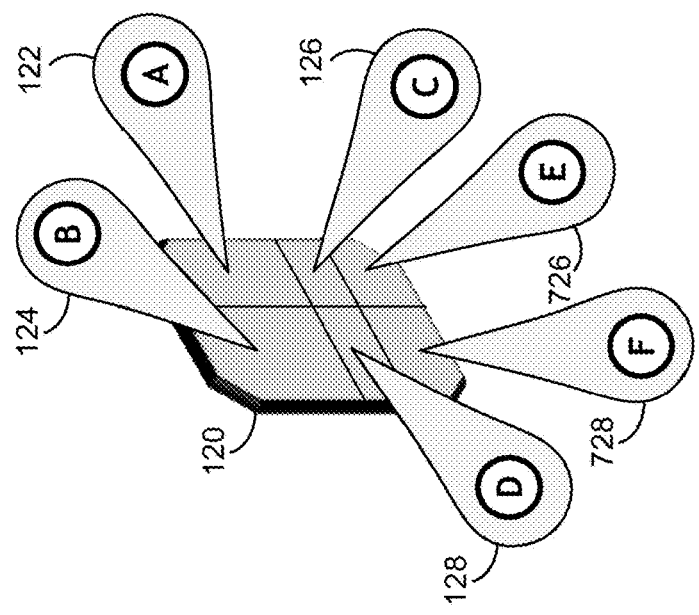
FIGS. 7A-7C are diagrams of exemplary subarrays and beam characteristics associated with one embodiment of the inventive concepts disclosed herein.
Figure 7B:
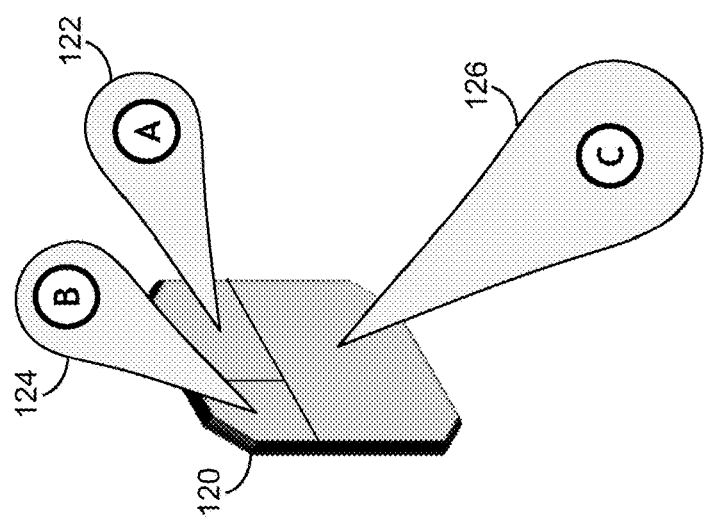
Figure 7A:
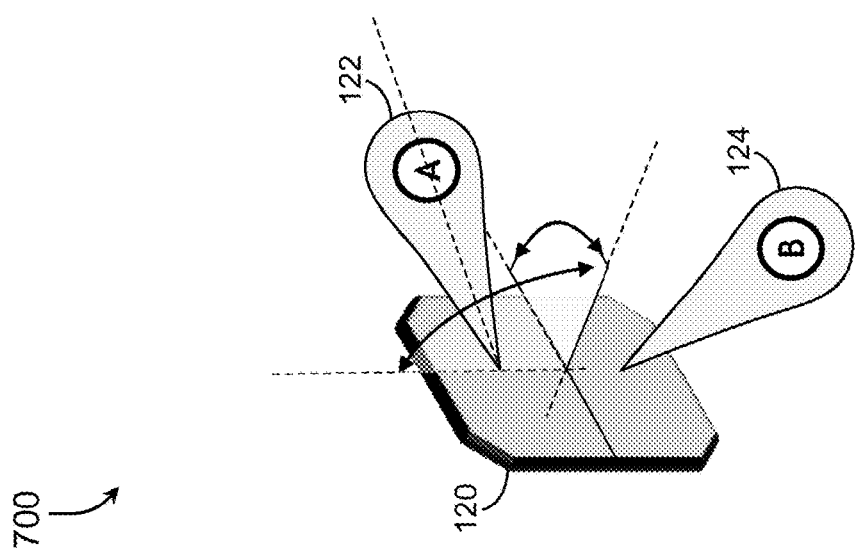

Referring now to FIGS. 7A-7C, diagrams of exemplary subarrays and beam characteristics associated with one embodiment of the inventive concepts disclosed herein are shown. Exemplary Configurations 700 may indicate symmetric as well as asymmetric subarray segment sizes available as the controller 110 segments the single AESA 120.

FIG. 7A may indicate a 50% split of the single AESA 120 between aperture beam A 122 and aperture beam B 124. FIG. 7B may indicate one asymmetric configuration where aperture beam C 126 may have a higher priority within the hierarchy of radar function than aperture beams A 122 and B 124. Here, aperture beam B 124 may have the smallest segment size enabling the smallest output power available for operation.

In one embodiment, the controller 110 may command a dynamic control of the radiation properties (amplitude/phase/bandwidth etc.) of each subarray to create aircraft system application (Contingency Operations) specific beam patterns.

FIG. 7C may indicate one exemplary configuration with six asymmetric subarrays with corresponding segment sizes. One exemplary hierarchy of radar function may include aperture beams A 122 and B 124 being the highest priority, Aperture beams E 726 and F 728 being next on the hierarchy, and aperture beams C 126 and D 128 being at the lowest priority on the hierarchy.

In one embodiment, the controller 110 may adaptively and cooperatively overcome obstructions caused by the angle of the sub-arrays relative to the target of interest. For example, if an air traffic target is over water or in a mountainous region it could take one single beam over water or several beams at different angles to accurately image the target out of the mountainous region depending on where it is relative to the system's sub-arrays. It could also be that one subarray tracking a target is suddenly obstructed given its position on the aircraft whereas another could swap missions with it in order to maintain the same level of situational awareness.

FIG. 8

Figure 8:
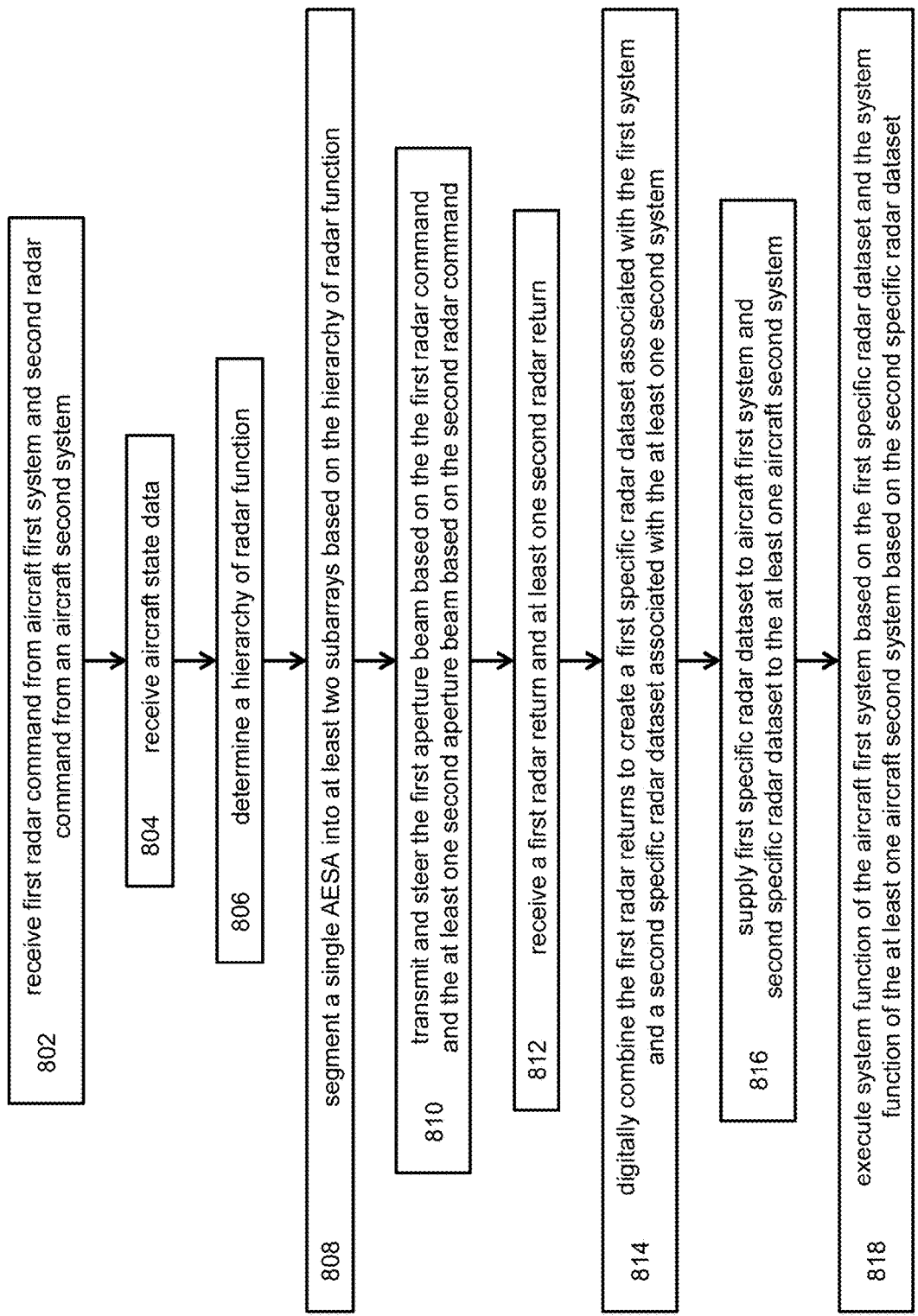
FIG. 8 is a diagram of a method flow exemplary of one embodiment of the inventive concepts disclosed herein.

Referring now to FIG. 8, a diagram of a method flow exemplary of one embodiment of the inventive concepts disclosed herein is shown. Method flow 800 may include, at a step 802, receiving a first radar command from a first system onboard the aircraft and a second radar command from at least one second system onboard the aircraft. Here, the first system may be associated with a single active electronically scanned array (AESA) mounted at a fixed boresight onboard the aircraft and the first radar command includes a first aperture beam characteristic, a first azimuth, a first elevation, a first amplitude, a first phase, a first side lobe level, and a first polarization associated with a first aperture beam. Also, the second radar command may be associated with the single AESA and includes a second aperture beam characteristic, a second azimuth, a second elevation, a second amplitude, a second phase, a second side lobe level, and a second polarization associated with at least one second aperture beam.

The method may continue, at a step 804, with receiving an aircraft state data from at least one aircraft state data sensor and, at a step 806, determining a hierarchy of radar function based on the aircraft state data.

The method may continue at a step 808 with in response to the first radar command and the second radar command, segmenting the single AESA into at least two subarrays based on the hierarchy of radar function, to transmit and receive the first aperture beam and the at least one second aperture beam, the first aperture beam having the first aperture beam characteristic based on the first radar command and the at least one second aperture beam having the at least one second aperture beam characteristic based on the second radar command A step 810 may include transmitting and steering the first aperture beam based on the first radar command and the at least one second aperture beam based on the second radar command while a step 812 may include receiving a first radar return from the first aperture beam and at least one second radar return from the at least one second aperture beam.

The method may include, at a step 814, digitally combining the first radar return and the at least one second radar return via a digital signal processing and creating a first specific radar dataset associated with the first system and a second specific radar dataset associated with the at least one second system and at a step 816, supplying the first system with the first specific radar dataset associated with the first system and the at least one second system with the second specific radar dataset associated with the at least one second system.

The method may then include, at a step 818, executing the system function of the first system based on the first specific radar dataset associated with the first system and the system function of the at least one second system based on the second specific radar dataset associated with the second system.

CONCLUSION

As will be appreciated from the above description, embodiments of the inventive concepts disclosed herein may provide a novel solution to enable a single fixed AESA to segment into a plurality of subarrays enabling continuous GCS while simultaneous performing multiple additional functions.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A multi-beam multi-function radar antenna system, comprising:
   a single active electronically scanned array (AESA) mounted at a fixed boresight onboard an aircraft, the single AESA configured for a segmented aperture enabling a first aperture beam having a first aperture beam characteristic, a first azimuth, and a first elevation, the segmented aperture also enabling at least one second aperture beam having a second aperture beam characteristic, a second azimuth, and a second elevation, each of the first aperture beam and the at least one second aperture beam being independently steered, coherent, and simultaneously radiated from the single AESA;
   at least one aircraft system onboard the aircraft configured to 1) receive a specific radar dataset from the single AESA and 2) perform a system function based on the received specific radar dataset, the specific radar dataset provided by one of the first aperture beam and the at least one second aperture beam;
   a controller operatively coupled with the single AESA and the at least one aircraft system;
   a tangible, non-transitory memory configured to communicate with the controller, the tangible, non-transitory memory having instructions stored therein that, in response to execution by the controller, cause the controller to:
   receive a first radar command from a first system of the at least one aircraft system and a second radar command from at least one second system of the at least one aircraft system, the first radar command includes the first aperture beam characteristic, the first azimuth, the first elevation, the second radar command includes the second aperture beam characteristic, the second azimuth, and the second elevation;
   in response to the first radar command and the second radar command, segment the single AESA into at least two AESA subarrays, based on the first radar command and the second radar command, to transmit and receive the first aperture beam and the at least one second aperture beam, the first aperture beam having the first aperture beam characteristic based on the first radar command and the at least one second aperture beam having the at least one second aperture beam characteristic based on the second radar command;
   transmit and steer the first aperture beam based on the first radar command and the at least one second aperture beam based on the second radar command;
   receive a first radar return from the first aperture beam and at least one second radar return from the at least one second aperture beam;
   digitally combine the first radar return from the first aperture beam and the at least one second radar return from the at least one second aperture beam via a digital signal processing to create a first specific radar dataset associated with the first system and a second specific radar dataset associated with the at least one second system;
   supply the first system with the first specific radar dataset associated with the first system and the at least one second system with the second specific radar dataset associated with the at least one second system; and
   execute the system function of the first system based on the first specific radar dataset associated with the first system and the system function of the at least one second system based on the second specific radar dataset associated with the at least one second system.

2. The multi-beam multi-function radar antenna system of claim 1, further including at least one aircraft state sensor configured to provide an aircraft state data and phase of flight to the controller, and wherein the controller is further configured to receive the aircraft state data and phase of flight and determine a radar function hierarchy based on the received aircraft state data and phase of flight.

3. The multi-beam multi-function radar antenna system of claim 2, wherein the at least two subarrays are one of: a plurality of symmetric subarrays and a plurality of asymmetric subarrays, based on the radar function hierarchy.

4. The multi-beam multi-function radar antenna system of claim 2, wherein the at least one aircraft state data includes one of an altitude, an airspeed, a climb configuration, a descent configuration, a cruise configuration, an approach configuration, a landing configuration, and a taxi configuration.

5. The multi-beam multi-function radar antenna system of claim 1, wherein the first aperture beam characteristic and the second aperture beam characteristic further comprises at least one of: an aperture beam power, an AESA segment size, a beamwidth, an azimuth scan, an elevation scan, a side lobe level, a polarization, an amplitude, and a phase.

6. The multi-beam multi-function radar antenna system of claim 5, wherein the first system further comprises a weather detection system and wherein the first radar command has a power between 155 and 205 dBm.

7. The multi-beam multi-function radar antenna system of claim 5, wherein the at least one second system further comprises a vertical weather profiling system.

8. The multi-beam multi-function radar antenna system of claim 5, wherein the at least one second system further comprises a predictive windshear system.

9. The multi-beam multi-function radar antenna system of claim 5, wherein the at least one second system further comprises one of: a runway imaging system, a ground mapping system, and a geophysical obstacle clearance system.

10. The multi-beam multi-function radar antenna system of claim 1, wherein the controller is further configured to combine at least two subarrays into a combined subarray and tailor an excitation of the combined subarray based on the first radar command.

11. The multi-beam multi-function radar antenna system of claim 1, wherein segment the single AESA into at least two subarrays based on the first radar command and the second radar command further comprises a time based switching of a function of the at least two subarrays between compliance with the first radar command and compliance with the second radar command.

12. A method for simultaneous multi-beam multi-function radar antenna operation, comprising:
   receiving a first radar command from a first system onboard an aircraft, the first system associated with a single active electronically scanned array (AESA) mounted at a fixed boresight onboard the aircraft, the first radar command includes a first aperture beam characteristic, a first azimuth, and a first elevation associated with a first aperture beam;

receiving a second radar command from at least one second system onboard the aircraft, the second radar command associated with the single AESA and includes a second aperture beam characteristic, a second azimuth, and a second elevation associated with at least one second aperture beam;

receiving an aircraft state data from at least one aircraft state data sensor;

determining a hierarchy of radar function based on the aircraft state data;

in response to the first radar command and the second radar command, segmenting the single AESA into at least two subarrays based on the hierarchy of radar function, to transmit and receive the first aperture beam and the at least one second aperture beam, the first aperture beam having the first aperture beam characteristic based on the first radar command and the at least one second aperture beam having the second aperture beam characteristic based on the second radar command;

transmitting and steering the first aperture beam based on the first radar command and the at least one second aperture beam based on the second radar command;

receiving a first radar return from the first aperture beam and at least one second radar return from the at least one second aperture beam;

digitally combining the first radar return and the at least one second radar return via a digital signal processing and creating a first specific radar dataset associated with the first system and a second specific radar dataset associated with the at least one second system;

supplying the first system with the first specific radar dataset associated with the first system and the at least one second system with the second specific radar dataset associated with the at least one second system; and executing a system function of the first system based on the first specific radar dataset associated with the first system and the system function of the at least one second system based on the second specific radar dataset associated with the at least one second system.

13. The method for simultaneous multi-beam multi-function radar antenna operation of claim 12, wherein the second radar command further includes each of an amplitude control and a phase control to enable a radiation pattern synthesis between the at least two subarrays, and wherein executing the system function of the at least one second system is based on the radiation pattern synthesis.

* * * * *